US012587073B2

(12) United States Patent
Kim

(10) Patent No.: US 12,587,073 B2
(45) Date of Patent: Mar. 24, 2026

(54) MOUNTING STRUCTURE OF GROUND RING OF MOTOR

(71) Applicant: HYUNDAI MOBIS CO., LTD., Seoul (KR)

(72) Inventor: Goon Chul Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 200 days.

(21) Appl. No.: 18/375,678

(22) Filed: Oct. 2, 2023

(65) Prior Publication Data

US 2024/0128839 A1 Apr. 18, 2024

(30) Foreign Application Priority Data

Oct. 18, 2022 (KR) ........................ 10-2022-0133875

(51) Int. Cl.
*H02K 11/40* (2016.01)
(52) U.S. Cl.
CPC .................................... *H02K 11/40* (2016.01)
(58) Field of Classification Search
CPC ............................... H02K 11/40; H02K 7/003
See application file for complete search history.

(56) References Cited

U.S. PATENT DOCUMENTS

2022/0255407 A1* 8/2022 Chen ...................... H02K 7/003

FOREIGN PATENT DOCUMENTS

| CN | 114629307 A | 6/2022 | |
| EP | 3086448 A1 * | 10/2016 | ............. H02K 15/00 |

OTHER PUBLICATIONS

Office action issued on Mar. 11, 2024 for corresponding EP Patent Application No. 23203226.8.

* cited by examiner

*Primary Examiner* — Naishadh N Desai
(74) *Attorney, Agent, or Firm* — Morgan, Lewis & Bockius LLP

(57) ABSTRACT

Provided is a mounting structure of a shaft ground ring of a motor in which a second contact part of the ground ring is inserted into a hole positioned in a rotating shaft, thus making the ground ring be in contact with an inner circumferential surface of the rotating shaft to transfer an axial current occurring in a rotor to a motor housing.

4 Claims, 8 Drawing Sheets

[FIG. 1]
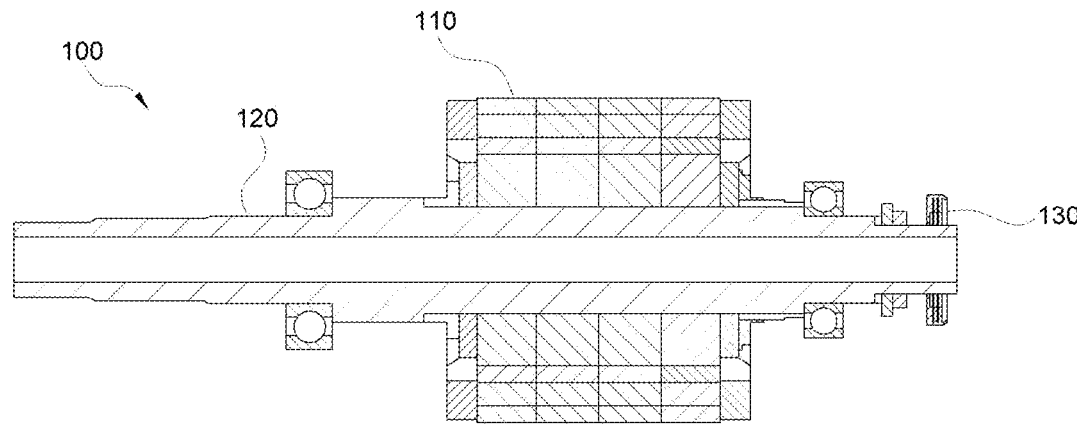
-RELATED ART-

[FIG. 2]
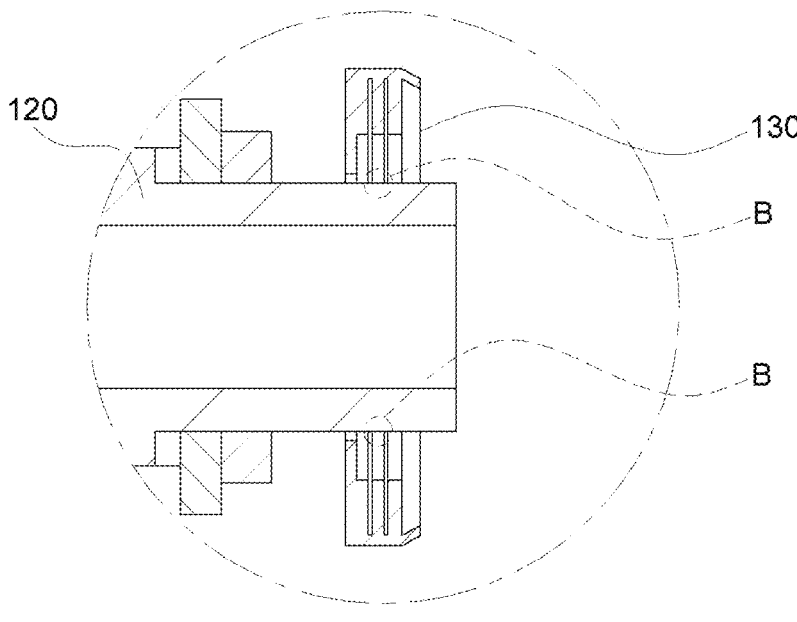
-RELATED ART-

[FIG. 3]
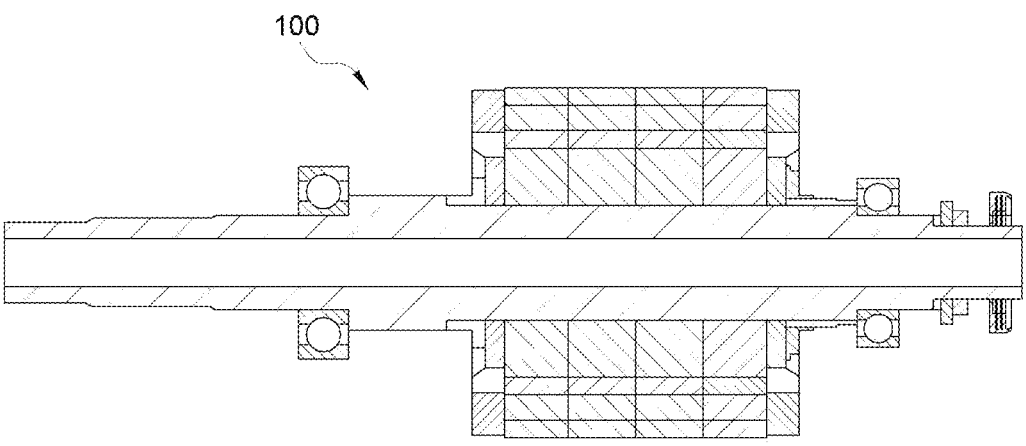
100
-RELATED ART-

[FIG. 4A]
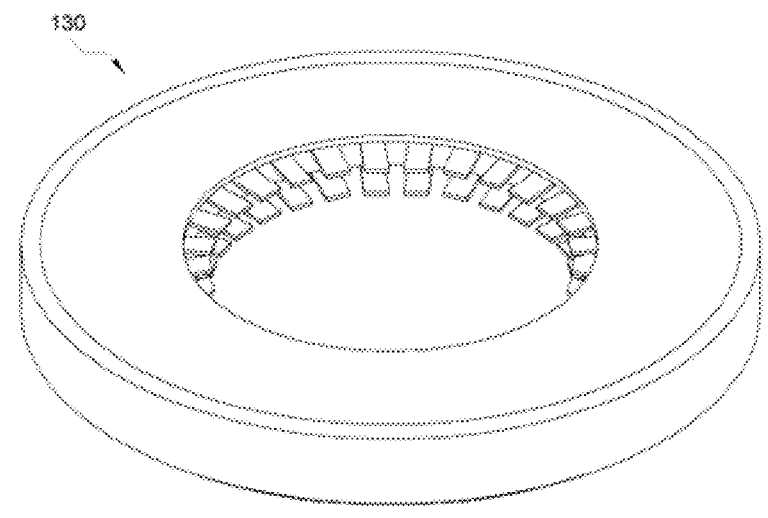
-RELATED ART-
[FIG. 4B]
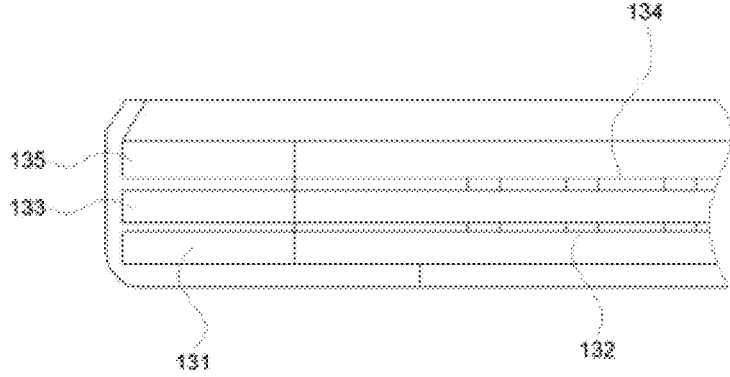
-RELATED ART-

[FIG. 5]
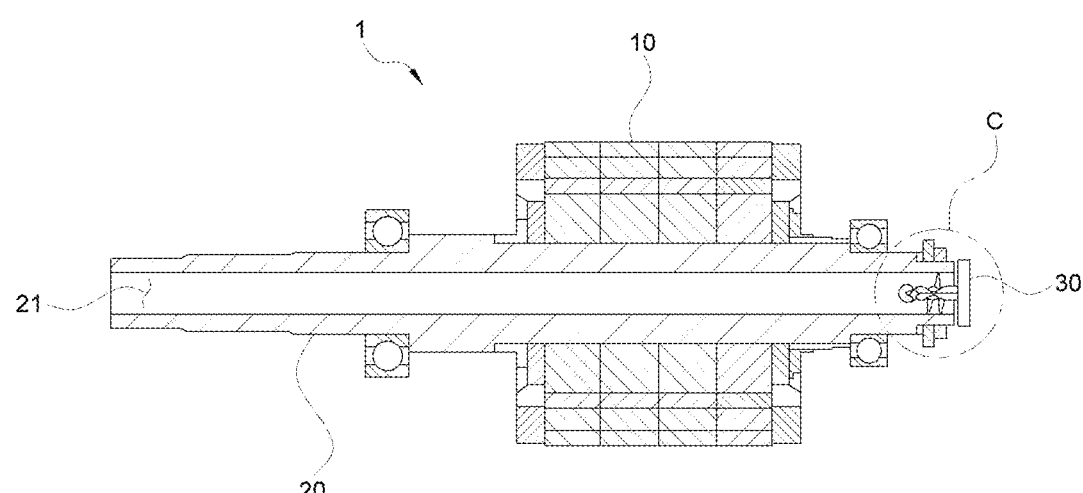

[FIG. 6]
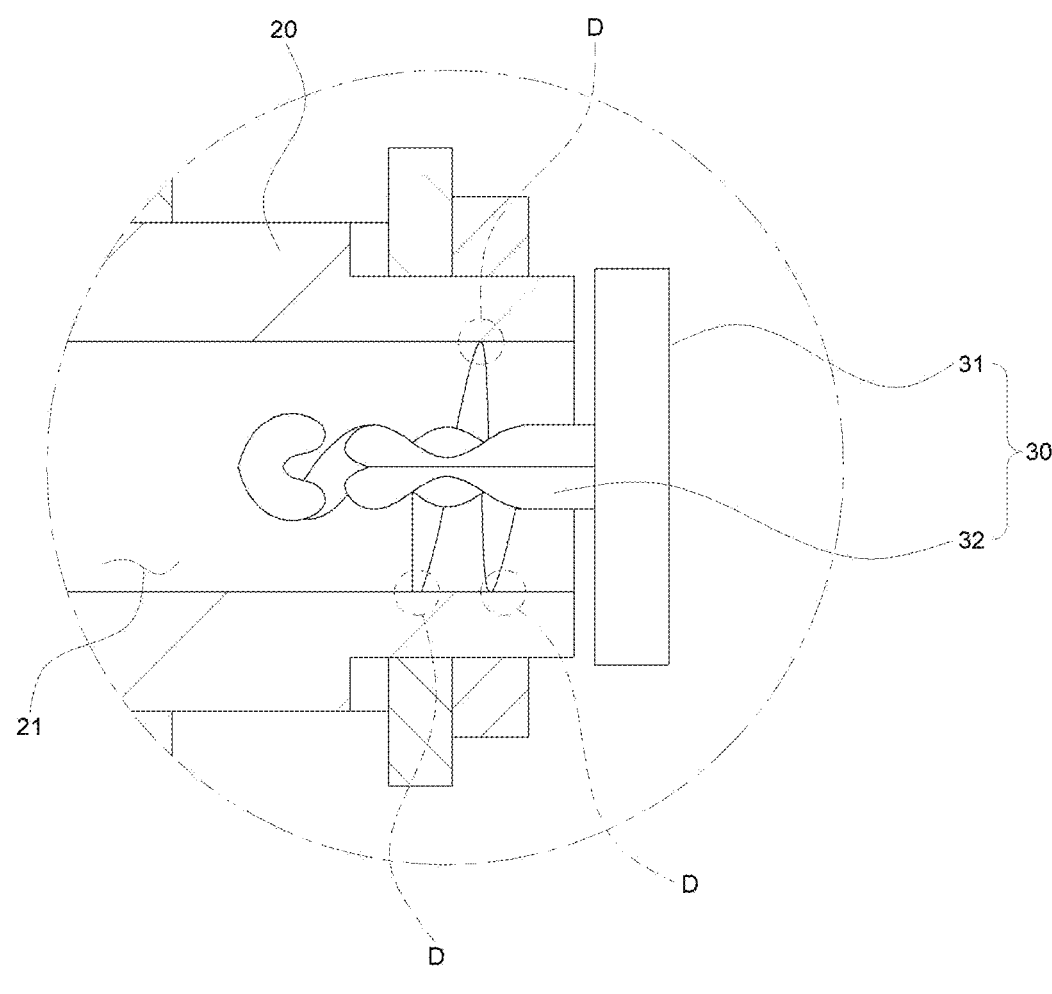

[FIG. 7]
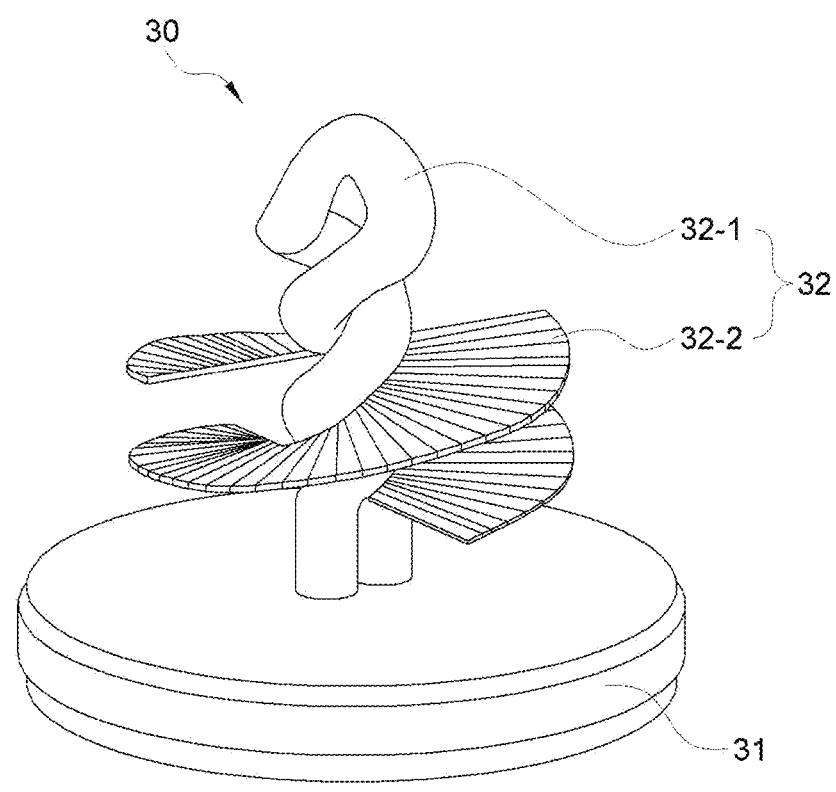

[FIG. 8A]
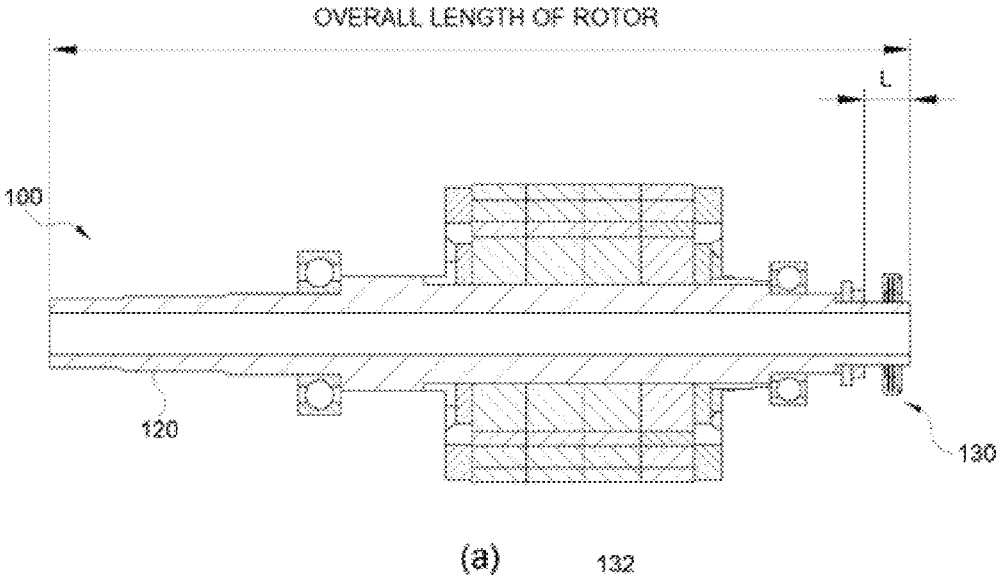
(a)        132
[FIG. 8B]
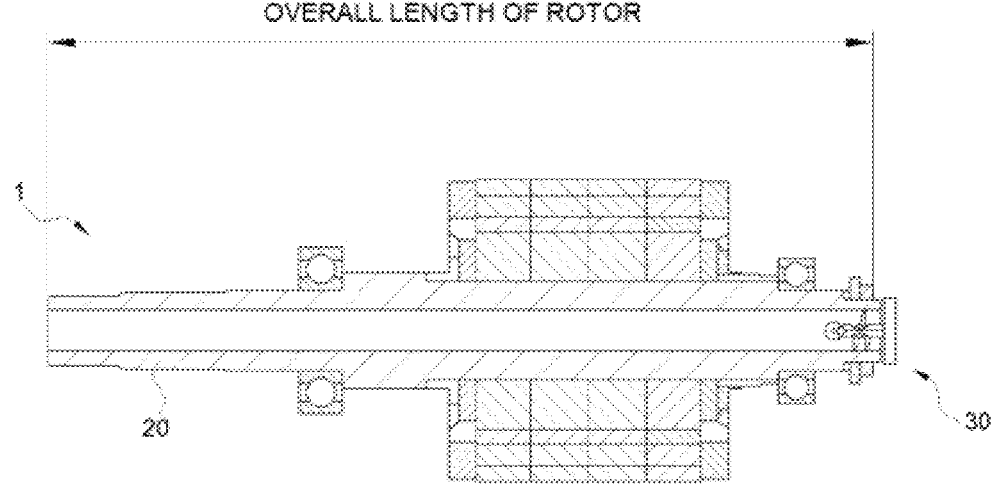

MOUNTING STRUCTURE OF GROUND RING OF MOTOR

CROSS-REFERENCE TO RELATED APPLICATIONS

This application claims priority under 35 U.S.C. § 119 to Korean Patent Application No. 10-2022-0133875, filed on Oct. 18, 2022, in the Korean Intellectual Property Office, the disclosure of which is incorporated herein by reference in its entirety.

TECHNICAL FIELD

The following disclosure relates to a mounting structure of a shaft ground ring of a motor, and more particularly, to a mounting structure of a shaft ground ring of a motor in which a second contact part of the ground ring is inserted into a hole positioned in a rotating shaft, thus making the ground ring be in contact with an inner circumferential surface of the rotating shaft to transfer an axial current occurring in a rotor to a motor housing.

BACKGROUND

A motor may include a rotor and a stator. In a general permanent magnet motor, a coil may be wound on a core of the stator, and a permanent magnet may be attached to an outer circumferential surface of a core of the rotor or the permanent magnet may be inserted into the core of the rotor.

In order to rotate the motor, a rotor system may be formed by applying a current to a stator coil while changing its direction. When the rotor system is formed, the permanent magnet installed in the rotor may receive an attractive force or a repulsive force from the rotor system, which may cause the rotor to be rotated.

Meanwhile, when applying the current to the stator coil while changing its direction, a polarity of a magnetic field applied to a surface of the rotor core is changed. Here, the axial current may occur in the rotor by an electromagnetic induction phenomenon. The axial current occurring in the rotor may cause electrical corrosion of a bearing that supports a rotating shaft to be rotated in a motor housing or shorten a lifespan of the motor.

In order to solve this problem, a ground ring may be conventionally installed between the rotating shaft and the motor housing to ground the axial current occurring in the rotating shaft through the motor housing.

FIG. 1 is a view showing a conventional mounting structure of a shaft ground ring of a motor; FIG. 2 is an enlarged view of a part A of FIG. 1; and FIG. 3 is a view showing a flow of an axial current in the conventional mounting structure of the shaft ground ring of the motor.

Referring to FIG. 1, in a conventional mounting structure 100 of a shaft ground ring of a motor, a ground ring 130 may be coupled to one end in a length direction of a rotating shaft 120 supported to be rotated in a motor housing 110. In addition, referring to FIG. 2, the ground ring 130 may be coupled to the rotating shaft 120 to surround an outer circumferential surface of the rotating shaft 120 for a predetermined part B to be in contact with the rotating shaft 120.

Through this configuration, as shown in FIG. 3, the axial current may be grounded from a rotor to the motor housing 110 through the rotating shaft 120 and the ground ring 130.

Meanwhile, a large number of parts may be required to manufacture the ground ring 130 included in the conventional mounting structure 100 of the shaft ground ring of the motor, and its structure may be complicated.

FIGS. 4A and 4B are views showing the ground ring included in the conventional mounting structure of the shaft ground ring of the motor.

For example, as shown in FIG. 4B, the ground ring 130 may include plates 131, 133 and 135, which are alternately laminated and compressed, and carbon fibers 132 and 134. Therefore, at least five or more parts are required to manufacture the ground ring 130, and its structure may be complicated.

In addition, in order to couple the ground ring 130 to one end of the rotating shaft 120 in the length direction, the rotating shaft 120 needs to be longer than the rotating shaft 120 without the ground ring 130. Therefore, the conventional mounting structure 100 of the shaft ground ring of the motor including the rotating shaft 120 may have a larger size.

Therefore, there is a need to develop a mounting structure of a shaft ground ring of a motor including a ground ring which has a simple structure and may be manufactured using fewer parts, and preventing lengthening of a rotating shaft 120.

SUMMARY

An embodiment of the present disclosure is directed to providing a mounting structure of a shaft ground ring of a motor which includes a ground ring having a simple structure and capable of being manufactured using fewer parts.

Another embodiment of the present disclosure is directed to providing a mounting structure of a shaft ground ring of a motor which may prevent lengthening of a rotating shaft.

Aspects of the present disclosure are not limited to the above-mentioned aspects, and other aspects that are not mentioned here may be obviously understood by those skilled in the art from the following description.

In one general aspect, a mounting structure of a shaft ground ring of a motor includes: a motor housing including a stator having a core on which a coil is wound and a rotor having a permanent magnet; a rotating shaft coupled to the rotor, supported by a bearing to be rotated in the motor housing, and having a hollow shape in which a hole passes through the inside thereof; and a ground ring including a first contact part electrically connected to the motor housing and a second contact part in contact with the rotating shaft, and transferring an axial current occurring in the rotor to the motor housing, wherein the ground ring has the first contact part coupled to one end of the rotating shaft in a length direction and the second contact part inserted into the hole of the rotating shaft.

The first contact part may be a base plate, and the second contact part may include a first protruding piece coupled to one surface of the base plate that faces the hole of the rotating shaft and protruding toward the hole, and a second protruding piece coupled to the first protruding piece and extending toward an inner circumferential surface of the rotating shaft to be in contact with the inner circumferential surface of the rotating shaft.

The second protruding piece is provided in plural, and the plurality of second protruding pieces may be coupled with the first protruding piece.

Each of the plurality of second protruding pieces may be made of a carbon fiber.

The first protruding piece may be made of a wire, and the plurality of carbon fibers of the plurality of second protruding pieces may be coupled to the wire in a spiral shape.

Details of other embodiments are included in the description and drawings of the present disclosure.

BRIEF DESCRIPTION OF THE DRAWINGS

FIG. 1 is a view showing a conventional mounting structure of a shaft ground ring of a motor.

FIG. 2 is an enlarged view of a part A of FIG. 1.

FIG. 3 is a view showing a flow of an axial current in the conventional mounting structure of the shaft ground ring of the motor.

FIGS. 4A and 4B are views showing a ground ring included in the conventional mounting structure of the shaft ground ring of the motor.

FIG. 5 is a view showing a mounting structure of a shaft ground ring of a motor according to an embodiment of the present disclosure.

FIG. 6 is an enlarged view of a part C of FIG. 5.

FIG. 7 is a view showing the ground ring of FIG. 5.

FIGS. 8A and 8B are views showing a length of a rotating shaft in the conventional mounting structure of the shaft ground ring of the motor and a length of a rotating shaft in the mounting structure of the shaft ground ring of the motor according to an embodiment of the present disclosure.

DETAILED DESCRIPTION OF EMBODIMENTS

Hereinafter, embodiments are described in detail with reference to the accompanying drawings to be easily practiced by those skilled in the art to which the present disclosure pertains. However, the present disclosure may be implemented in various different forms and is not limited to the embodiments described herein. In addition, in the drawings, portions unrelated to the description are omitted to clearly describe the present disclosure, and similar portions are denoted by similar reference numerals throughout the specification.

Throughout the specification, when one part is referred to as being "connected to" another part, one part and another part may be "directly connected to" each other, or may be "electrically connected to" each other with a third part interposed therebetween.

Throughout the specification, when one member is referred to as being positioned "on" another member, one member and another member may be in contact with each other, or a third member may be interposed between one member and another member.

Throughout the specification, "including" one component is to be understood to imply the inclusion of other components rather than the exclusion of other components, unless explicitly described to the contrary. As used throughout the specification, a term of degree "about", "substantially", or the like is used to indicate the number of a stated meaning or its approximation when its manufacturing or material tolerance inherent therein is given. Such a term is used to prevent unscrupulous infringers from unfairly using the present disclosure in which exact or absolute figures are stated to facilitate the understanding of this application. As used throughout the specification, a term of "step of (doing)" or "step of~" does not indicate a "step for~".

Hereinafter, the embodiments of the present disclosure are described in detail with reference to the accompanying drawings and the description provided below. However, the present disclosure is not limited to the embodiments described herein, and may also be embodied in another form. The same reference numerals denote the same components throughout the specification.

Hereinafter, the description describes a mounting structure of a shaft ground ring of a motor according to an embodiment of the present disclosure.

FIG. 5 is a view showing the mounting structure of the shaft ground ring of the motor according to an embodiment of the present disclosure.

Referring to FIG. 5, a mounting structure 1 of a shaft ground ring of a motor may include a motor housing 10, a rotating shaft 20, and a ground ring 30.

First, the motor housing 10 is described.

The motor housing 10 may include a stator in which a coil is wound on its core and a rotor which includes a permanent magnet. This motor housing 10 may have the same structure as a conventional motor housing 110.

Next, the rotating shaft 20 is described.

The rotating shaft 20 may extend in a length direction and have a hollow shape in which a hole 21 passes through the inside thereof.

In addition, the rotating shaft 20 may be coupled to the rotor and supported by a bearing to be rotated in the motor housing 10. Therefore, when the rotor is rotated, the rotating shaft 20 may be rotated while being supported by the bearing of the motor housing 10.

Next, the ground ring 30 is described.

As shown in FIG. 5, the ground ring 30 may be coupled to one end of the rotating shaft 20 in the length direction to transfer an axial current occurring in the rotor to the motor housing 10.

FIG. 6 is an enlarged view of a part C of FIG. 5.

Referring to FIG. 6, the ground ring 30 may include a first contact part 31 and a second contact part 32.

The first contact part 31 may be electrically connected to the motor housing 10 and coupled to one end of the rotating shaft 20 in the length direction.

The second contact part 32 may be inserted into the hole 21 of the rotating shaft 20, and the rotating shaft 20 and a predetermined part D thereof may thus be in contact with each other.

FIG. 7 is a view showing the ground ring of FIG. 5.

In detail, referring to FIG. 7, the first contact part 31 may be formed as a base plate made of a material which may conduct electricity, and the second contact part 32 may include a first protruding piece 32-1 and a second protruding piece 32-2.

The first protruding piece 32-1 may be coupled to one surface of the base plate that faces the hole 21 of the rotating shaft 20 and protrude toward the hole 21. For example, the first protruding piece 32-1 may be a wire coupled to one surface of the base plate and protruding toward the hole 21.

The second protruding piece 32-2 may be coupled to the first protruding piece 32-1, and extend toward an inner circumferential surface of the rotating shaft 20 to be in contact with the inner circumferential surface of the rotating shaft 20. For example, the second protruding piece 32-2 may be made of a carbon fiber coupled to the first protruding piece 32-1.

When the second protruding piece 32-2 is made of the carbon fiber as described above, the carbon fiber may have high abrasion resistance, thus preventing wear of the second protruding piece 32-2 in contact with the rotating shaft 20 in rotation for a long time as much as possible.

Meanwhile, as shown in FIG. 7, the plurality of second protruding piece 32-2 made of the carbon fibers may be coupled to the first protruding piece 32-1 made of the wire. The plurality of carbon fibers may be coupled to the wire in a spiral shape.

For example, as shown in FIG. 7, the plurality of carbon fibers inserted between the wires may be coupled to the wires in the spiral shape when twisting the wires after the plurality of carbon fibers are inserted between the wires coupled to one surface of the first contact part 31 formed as the base plate.

As such, the mounting structure 1 of the shaft ground ring of the motor may include the ground ring 30 having a simple structure and using fewer parts such as the first contact part 31, the first protruding piece 32-1, and the second protruding piece 32-2, thus lowering a manufacturing cost.

In addition, as the ground ring 30 has the above-described configuration, the mounting structure 1 of the shaft ground ring of the motor according to an embodiment of the present disclosure may include a shorter rotating shaft 20 compared to that of the conventional mounting structure 100 of the shaft ground ring of the motor.

FIGS. 8A and 8B are views showing a length of the rotating shaft in the conventional mounting structure of the shaft ground ring of the motor and a length of the rotating shaft in the mounting structure of the shaft ground ring of the motor according to an embodiment of the present disclosure.

In detail, as shown in FIG. 8, in the conventional mounting structure 100 of the shaft ground ring of the motor, the rotating shaft 120 may extend by a predetermined length L in order for the ground ring 130 to be coupled to the outer circumferential surface of the rotating shaft 120 (see FIG. 8A).

On the other hand, in the mounting structure 1 of the shaft ground ring of the motor according to an embodiment of the present disclosure, the ground ring 30 may be coupled to one end of the rotating shaft 20 in the length direction and in contact with the inner circumferential surface of the rotating shaft 20. Therefore, the rotating shaft 20 does not need to extend for the ground ring 30 to be coupled thereto.

As set forth above, the mounting structure of the shaft ground ring of the motor according to the present disclosure may include the first contact part formed as the base plate, and the second contact part including the first protruding piece coupled to one surface of the base plate and the second protruding piece coupled to the first protruding piece, and thus include the ground ring that may be manufactured with the simple structure and the fewer parts, thereby lowering the manufacturing cost.

In addition, the mounting structure of the shaft ground ring of the motor according to the present disclosure may include the ground ring configured in such a manner that the second contact part in contact with the rotating shaft is inserted into the hole of the rotating shaft to thus prevent the lengthening of the rotating shaft, and thus be manufactured to be smaller.

As set forth above, the mounting structure of the shaft ground ring of the motor according to the present disclosure may include the first contact part formed as the base plate, and the second contact part including the first protruding piece coupled to one surface of the base plate and the second protruding piece coupled to the first protruding piece, and thus include the ground ring that may be manufactured with the simple structure and the fewer parts, thereby lowering the manufacturing cost.

In addition, the mounting structure of the shaft ground ring of the motor according to the present disclosure may include the ground ring configured in such a manner that the second contact part in contact with the rotating shaft is inserted into the hole of the rotating shaft to thus prevent the lengthening of the rotating shaft, and thus be manufactured to be smaller.

The above-described embodiments are illustratively provided, and it is apparent to those skilled in the art to which the present disclosure pertains that the present disclosure may be embodied in another specific form without any change in the technical idea or essential characteristics of the present disclosure. Therefore, it is to be understood that the embodiments described above are illustrative rather than being restrictive in all aspects. For example, the components each described as a single type may also be implemented in a distributed manner, and similarly, the components described as being distributed may also be implemented in a combined manner.

It is to be understood that the scope of the present disclosure is defined by the claims disclosed below rather than the detailed description provided above, and includes all alternations and modifications derived from the claims and their equivalents.

What is claimed is:

1. A mounting structure of a ground ring of a motor, the mounting structure comprising:
   a motor housing including a stator having a core on which a coil is wound and a rotor having a permanent magnet;
   a rotating shaft coupled to the rotor, supported by a bearing to be rotated in the motor housing, and having a hollow shape in which a hole passes through an inside thereof; and
   a ground ring including a first contact part electrically connected to the motor housing and a second contact part in contact with the rotating shaft, and transferring an axial current occurring in the rotor to the motor housing,
   wherein the ground ring has the first contact part coupled to one end of the rotating shaft in a length direction and the second contact part inserted into the hole of the rotating shaft,
   wherein the first contact part is a base plate, and the second contact part includes a first protruding piece coupled to one surface of the base plate that faces the hole of the rotating shaft and protruding toward the hole, and a second protruding piece coupled to the first protruding piece and extending toward an inner circumferential surface of the rotating shaft to be in contact with the inner circumferential surface of the rotating shaft, wherein a first protruding piece is twisted.

2. The mounting structure of claim 1, wherein the second protruding piece is provided in plural, and the plurality of second protruding pieces are coupled with the first protruding piece.

3. The mounting structure of claim 2, wherein each of the plurality of second protruding pieces is made of a carbon fiber.

4. The mounting structure of claim 3, wherein the first protruding piece is made of a wire, and
   the plurality of carbon fibers of the plurality of second protruding pieces are coupled to the wire in a spiral shape.

* * * * *